United States Patent Office 3,159,621
Patented Dec. 1, 1964

3,159,621
6-KETO PREGNENES
Albert Bowers and Otto Halpern, Mexico City, Mexico, assignors to Syntex Corporation, Panama, Panama, a corporation of Panama
No Drawing. Filed Aug. 14, 1963, Ser. No. 301,955
Claims priority, application Mexico, May 7, 1963, 72,282
17 Claims. (Cl. 260—239.55)

The present invention relates to certain novel cyclopentanoperhydrophenanthrene derivatives and to a method for the production thereof.

More particularly, the present invention relates to the method for making the novel 3-desoxy-6-keto-$\Delta^{1,3,5(10)}$-19-nor-pregnatriene-derivatives represented by the following formulas:

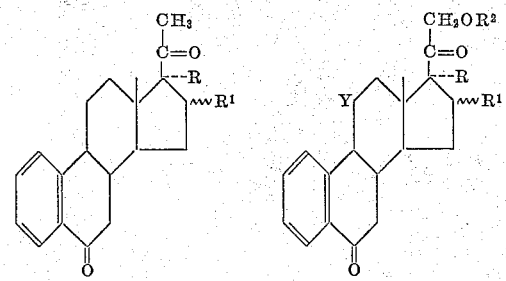

In the preceding formulas R represents hydrogen, hydroxy or an acyloxy radical of less than 12 carbon atoms; $R^1$ represents hydrogen, $\alpha$-methyl, $\beta$-methyl, $\alpha$-hydroxy or $\alpha$-acyloxy, and when R and $R^1$ represent $\alpha$-hydroxyl groups, together they represent the radical

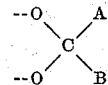

wherein A represents hydrogen or a lower alkyl radical and B represents a lower alkyl, aryl or aralkyl radical containing up to eight carbon atoms; $R^2$ represents hydrogen or an acyl group of less than 12 carbon atoms and Y represents hydrogen, $\beta$-hydroxy or a keto group.

The acyl and acyloxy groups above referred to are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butyl-acetate, phenoxyacetate, cyclopentylpropionate, aminoacetate, and $\beta$-chloropropionate.

The compounds, object of the present invention, are estrogenic type hormones showing anti-androgenic activity and relatively low feminizing effect; they are specially useful in fertility control and disorders in the female.

In our copending U.S. application Serial No. 302,008 filed of even date, there is described a general method for preparing 6-keto-$\Delta^{1,3,5(10)}$-estratrienes starting from 6-keto-$\Delta^{5(10)}$-19-nor steroids which comprises converting these last mentioned compounds into the 1$\alpha$-bromo derivatives by direct reaction with N-bromosuccinimide in carbon tetrachloride or through the enol acetate, followed by alkaline treatment of the 1$\alpha$-bromo-derivative and reflux with a dehydrohalogenating agent.

By the above method there are obtained 6-keto-$\Delta^{1,3,5(10)}$-19-nor-pregnatrienes in accordance with the following sequence of reactions:

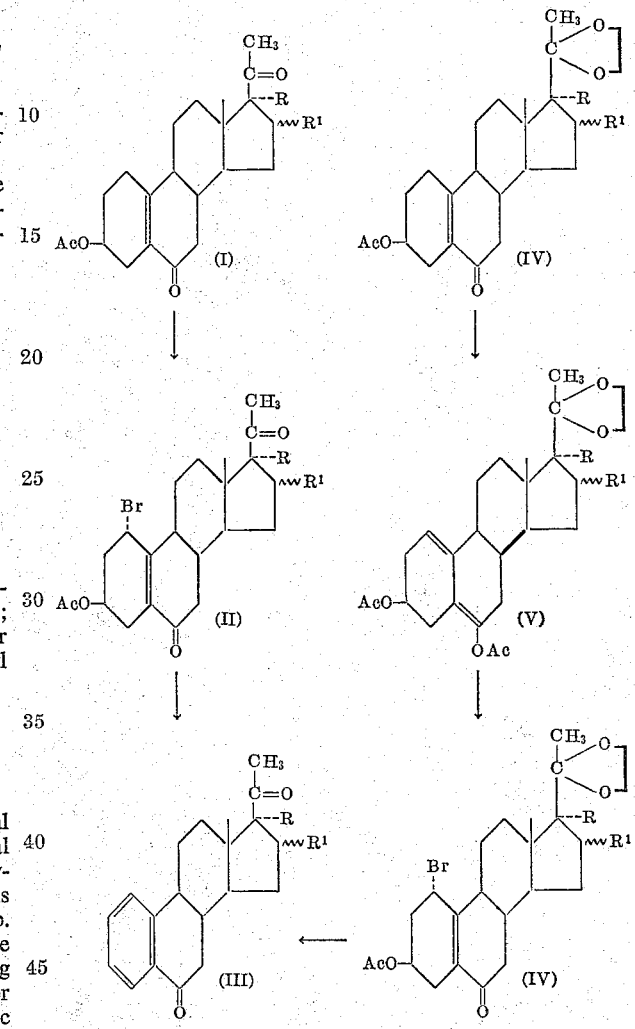

In the preceding formulas R and $R^1$ have the same meaning as heretofore indicated.

In practicing the process outlined above, the starting compounds I such as the acetate of $\Delta^{5(10)}$-19-nor-pregnen-3$\beta$-ol-6,20-dione the diacetate of $\Delta^{5(10)}$-19-nor-pregnene-3$\beta$,17$\alpha$-diol-6,20-dione, the 16-methyl derivatives thereof or the acetate of 16$\alpha$,17$\alpha$-isopropylidenedioxy-$\Delta^{5(10)}$-19-nor-pregnen-3$\beta$-ol-6,20-dione are obtained by oxidation of the $\Delta^5$-19-hydroxy pregnenes with chromic acid in pyridine, as described in our copending application Serial No. 293,891, filed July 9, 1963.

By reaction of the $\Delta^{5(10)}$-6-keto-19-nor-pregnenes (I) with approximately 1 molar equivalent of N-bromosuccinimide in carbon tetrachloride solution, at reflux temperature and for a period of time in the order of 30 minutes to 4 hours, there are obtained the corresponding 1$\alpha$-bromo-derivatives (II).

Alkaline treatment of the 1$\alpha$-bromo-$\Delta^{5(10)}$-6-keto-19- nor-pregnenes, such as for example by reaction with dilute potassium hydroxide solution in methanol, at reflux temperature, followed by reaction with a dehydrohalogenating agent, preferably with a tertiary amine such as γ-collidine, 2,4-lutidine, quinoline and the like, or with calcium carbonate in dimethyl formamide or dimethyl acetamide, there are obtained simultaneously dehydrobromination and dehydration of ring A, thus yielding Δ$^{1,3,5(10)}$-19-nor-pregnatriene-6,20-dione, Δ$^{1,3,5(10)}$-19-nor-pregnatrien-17α-ol-6,20-dione and the corresponding 16-substituted derivatives (III).

Alternatively these compounds may be obtained from 3 - acetoxy-20-ethylenedioxy-Δ$^{5(10)}$-19-nor-pregnen-6-one and its derivatives 16 and/or 17α-substituted (IV), which are converted into the respective enolacetates (V) by conventional methods, such as for example by refluxing with acetic anhydride or isopropenylacetate in the presence of p-toluenesulfonic acid.

By reaction of the 3,6-diacetoxy-20-ethylenedioxy or 3,6,17-triacetoxy 20-ethylenedioxy compounds with an N-bromoamide or N-bromoimide, in the presence of sodium acetate and using an inert solvent, at low temperature there are obtained the 1α-bromo-6-keto-20-ethylenedioxy-Δ$^{5(10)}$-19-nor-pregnenes (VI) which upon alkaline treatment followed by reaction with a dehydrohalogenating agent, as indicated hereinbefore in detail, give rise to the 20-ethylenedioxy-6-keto-Δ$^{1,3,5(10)}$-19-nor-pregnatrienes.

The ketal group is then hydrolyzed under acidic conditions, such as for example by reaction with p-toluenesulfonic acid in acetone, to produce also Δ$^{1,3,5(10)}$-19-nor-pregnatriene-6,20-dione, Δ$^{1,3,5(10)}$-19-nor-pregnatrien-17α-ol-6,20-dione and the 16-substituted derivatives thereof (III; R=H, OH).

The 17α-acyloxy compounds are obtained by esterification of Δ$^{1,3,5(10)}$-19-nor-pregnatrien-17α-ol-6,20-dione and its 16-methyl derivatives, by reaction with carboxylic acid anhydrides of less than 12 carbon atoms in benzene solution and in the presence of p-toluenesulfonic acid (III; R=acyloxy).

The compounds of the present invention possessing the dihydroxy acetone side chain as well as an oxygenated function at C–11 are obtained by the method illustrated by the following sequence of reactions:

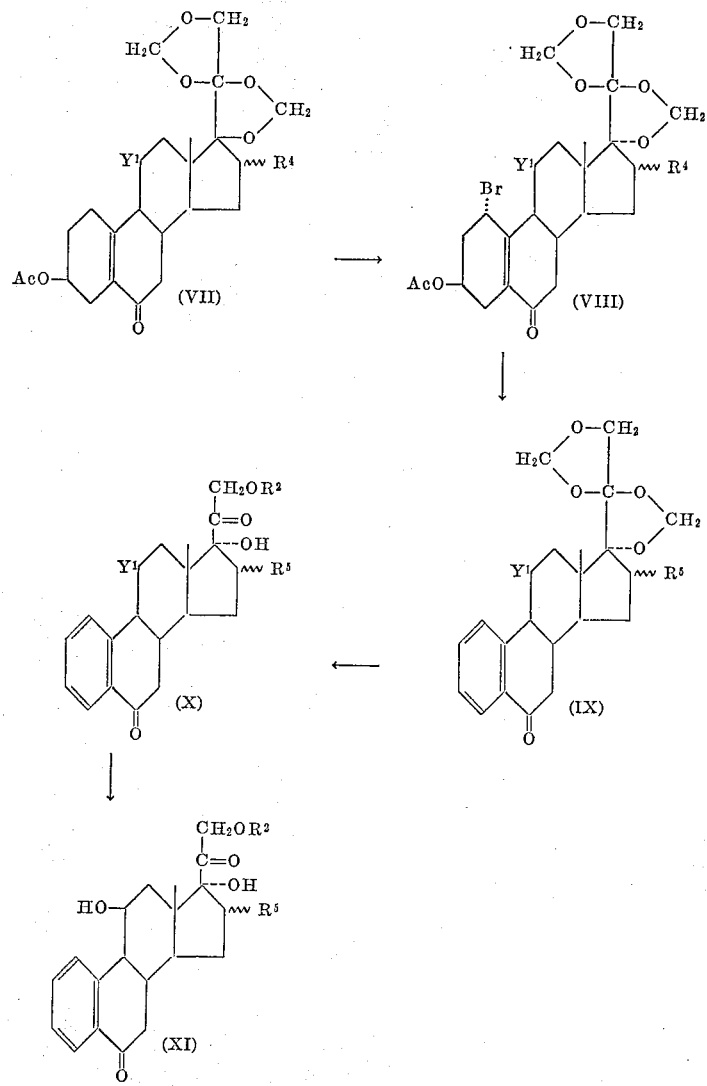

In the preceding formulas R$^2$ has the meaning as heretofore indicated; R$^4$ represents hydrogen, α-methyl, β-methyl or α-acyloxy; R$^5$ represents hydrogen, α-hydroxy, α-methyl or β-methyl and Y$^1$ represents hydrogen or a keto group.

The starting material for the process illustrated above are the acetate of 17,20;20,21-bismethylenedioxy-Δ$^{5(10)}$-19-nor-pregnen-3β-ol-6-one, the acetate of 17,20;20,21-bismethylenedioxy - Δ$^{5(10)}$ - 19-nor-pregnen-3β-ol-6,11-dione and the 16-methyl or 16-acyloxy derivatives thereof (VII).

By bromination of these compounds with 1.1 molar equivalents of N-bromosuccinimide or by forming the enol-acetate at C-6 prior to the bromination, as indicated hereinbefore in detail, there are obtained the 1α-bromocompounds (VIII), which upon alkaline treatment followed by reaction with a dehydrohalogenating agent give rise to the respective $\Delta^{1,3,5(10)}$-6-keto-19-nor-pregnatrienes (IX).

Upon hydrolysis of the bismethylenedioxy group by following conventional methods, preferably by heating with 60% formic acid, the dihydroxy-acetone side chain is regenerated, thus yielding $\Delta^{1,3,5(10)}$-19-nor-pregnatriene-17α,21 - diol - 6,20 - dione, $\Delta^{1,3,5(10)}$-19-nor-pregnatriene-17α,21-diol-6,11,20-trione and its 16-methyl or 16α-hydroxy substituted derivatives (X; $R^2$=H).

Microbiological incubation of the compounds lacking oxygenation at C–11 (X; $Y^1$=H, $R^2$=H), such as for example with cultures of *Curvularia lunata, Cunninghamella bainieri, Cunninghamella blakesleeans* or incubation with adrenal glands, give rise to $\Delta^{1,3,5(10)}$-19-nor-pregnatriene-11β,17α,21-triol-6,20-dione or the 16-substituted derivatives thereof (XI; $R^2$=H).

The compounds X and XI ($R^2$=H) may be converted into the 21-monoesters or 16,21-diesters by reaction with acid anhydrides or chlorides of less than 12 carbon atoms in pyridine solution (X and XI; $R^2$=acyl).

Oxidation of the esters of the 11β-hydroxylated compounds with chromic acid in aqueous acetic acid or 8 N chromic acid in acetone solution produce also the esters of $\Delta^{1,3,5(10)}$-19-nor-pregnatriene-17α,21-diol-6,11,20-trione as well as the 16-substituted derivatives.

By reaction of $\Delta^{1,3,5(10)}$-19-nor-pregnatriene-16α,17α,21-triol-6,20-dione or the 11-oxygenated derivatives with aldehydes or ketones in the presence of an acid catalyst, such as perchloric acid or p-toluenesulfonic acid, there are obtained the corresponding 16α,17α-ketals or cyclic acetals.

In order to obtain $\Delta^{1,3,5(10)}$-19-nor-pregnatrien-21-ol-6,20-dione, its 11-oxygenated and/or 16-methyl substituted derivatives, there is reacted $\Delta^{1,3,5(10)}$-19-nor-pregnatriene-6,20-dione and/or the 16-methyl substituted derivatives thereof with iodine in the presence of calcium oxide and in mixture of tetrahydrofuran-methanol to produce the corresponding 21-iodo-derivatives, which are then reacted with potassium acetate in acetone solution, preferably at reflux temperature, to produce the acetate of $\Delta^{1,3,5(10)}$-19-nor-pregnatrien-21-ol-6,20-dione and its 16-methyl derivatives.

Conventional saponification of these compounds afford the respective free compounds, which upon incubation with an oxygenating microorganism, as indicated hereinbefore, give rise to the respective 11β-hydroxylated derivatives, i.e., $\Delta^{1,3,5(10)}$-19-nor-pregnatriene-11β,21-diol-6,20-dione, 16α - methyl - $\Delta^{1,3,5(10)}$-19-nor-pregnatriene-11β,21-diol-6,20-dione and 16β-methyl-$\Delta^{1,3,5(10)}$-19-nor-pregnatriene-11β,21-diol-6,20-dione. From the 11β-hydroxylated compounds there may be obtained the corresponding 11-keto derivatives, by oxidation with chromic acid after previous esterification of the hydroxyl group at C–21.

The following examples serve to illustrate but are not intended to limit the scope of the present invention:

PREPARATION 1

A mixture of 5 g. of the 3-monoacetate of $\Delta^5$-pregnene-3β,19-diol-20-one, 75 cc. of 2-methyl, 2-ethyl-1,3-dioxolane and 200 mg. of p-toluenesulfonic acid was heated to boiling and reflux with distillation for 1 hour. The reaction mixture was cooled, diluted with water, extracted with ethyl acetate and the organic extract was washed to neutral, dried and evaporated to dryness. Crystallization from acetone-hexane gave 3-acetoxy-20-ethylenedioxy-$\Delta^5$-pregnen-19-ol.

A solution of 5 g. of the foregoing compound in 60 cc. of pyridine was added to a mixture of 5 g. of chromium trioxide in 60 cc. of pyridine. The reaction mixture was maintained at room temperature for 1 hour; at the end of this time it was diluted with ethyl acetate, filtered through celite and the filtrate washed well with water, dried and evaporated to dryness. Crystallization from acetone-hexane produced 3β-acetoxy-20-ethylenedioxy-$\Delta^{5(10)}$-19-nor-pregnen-6-one.

In the same manner, starting from the 3-monoacetate of 16α-methyl-$\Delta^5$-pregnene-3β,19-diol-20-one and the 3,17-diacetate of $\Delta^5$-pregnene-3β,17α,19-triol-20-one there were obtained as final products 16α-methyl-3β-acetoxy-20-ethylenedioxy - $\Delta^{5(10)}$ - 19-nor-pregnen-6-one and 3β,17α-diacetoxy-20-ethylenedioxy-$\Delta^{5(10)}$-19-nor-pregnen-6-one.

PREPARATION 2

To a solution of 5 g. of 16α-methyl-$\Delta^{5(10)}$-19-nor-pregnene-3β,17α,21-triol-6,20-dione in 200 cc. of chloroform there were added 40 cc. of a 37% aqueous formaldehyde solution and 5 cc. of concentrated hydrochloric acid, and the mixture was stirred for 48 hours at room temperature. The two layers were separated, the aqueous layer was washed with chloroform and the combined organic solutions were washed to neutral with water, dried over anhydrous sodium sulfate and evaporated to dryness. The residue was crystallized from methanol-ether, thus producing 16α-methyl-17,20;20,21-bismethylenedioxy-$\Delta^{5(10)}$-19-nor-pregnen-3β-ol-6-one.

A mixture of 5 g. of the foregoing compound, 20 cc. of pyridine and 10 cc. of acetic anhydride was kept at room temperature for 4 hours, poured into water and the formed precipitate collected by filtration. There was thus obtained the acetate of 16α-methyl-17,20;20,21-bismethylenedioxy-$\Delta^{5(10)}$-19-nor-pregnen-3β-ol-6-one.

In the same manner, 16β-methyl-$\Delta^{5(10)}$-19-nor-pregnene-3β,17α,21 - triol - 6,20-dione and $\Delta^{5(10)}$-19-nor-pregnene-3β,16α,17α,21-tetrol - 6,20 - dione produced as final products the acetate of 16β-methyl-17,20;20,21-bismethylenedioxy-$\Delta^{5(10)}$-19-nor-pregnen-3β-ol-6-one and the diacetate of 17,20;20,21 - bismethylenedioxy-$\Delta^{5(10)}$-19-nor-pregnen-3β,16α-diol-6-one.

Example I

A solution of 5 g. of the acetate of $\Delta^{5(10)}$-19-nor-pregnen-3β-ol-6,20-dione in 200 cc. of anhydrous carbon tetrachloride was refluxed with 2.8 g. (1.1 equivalents) of N-bromosuccinimide for 2 hours. The reaction mixture was filtered to eliminate the succinimide formed during the reaction and the filtrate was washed with water, dried over anhydrous sodium sulfate and evaporated to dryness under reduced pressure. Crystallization of the residue from methylene chloride-hexane gave the acetate of 1α-bromo-$\Delta^{5(10)}$-19-nor-pregnen-3β-ol-6,20-dione.

In the same manner the compounds below mentioned (I) were converted into the corresponding 1α-bromo derivatives (II):

| I | II |
| --- | --- |
| Acetate of 16α-methyl-$\Delta^{5(10)}$-19-nor-pregnen-3β-ol-6,20-dione. | Acetate of 1α-bromo-16α-methyl-$\Delta^{5(10)}$-19-nor-pregnen-3β-ol-6,20-dione. |
| Acetate of 16α,17α-isopropylidenedioxy-$\Delta^{5(10)}$-19-nor-pregnen-3β-ol-6,20-dione. | Acetate of 1α-bromo-16α,17α-isopropylidenedioxy-$\Delta^{5(10)}$-19-nor-pregnen-3β-ol-6,20-dione. |
| Diacetate of $\Delta^{5(10)}$-19-nor-pregnene-3β,17α-diol-6,20-dione. | Diacetate of 1α-bromo-$\Delta^{5(10)}$-19-nor-pregnene-3β,17α-diol-6,20-dione. |
| Acetate of 17,20;20,21-bismethylenedioxy-$\Delta^{5(10)}$-19-nor-pregnen-3β-ol-6-one. | Acetate of 1α-bromo-17,20;20,21-bismethylenedioxy-$\Delta^{5(10)}$-19-nor-pregnen-3β-ol-6-one. |
| Acetate of 17,20;20,21-bismethylenedioxy-$\Delta^{5(10)}$-19-nor-pregnen-3β-ol-6,11-dione. | Acetate of 1α-bromo-17,20;20,21-bismethylenedioxy-$\Delta^{5(10)}$-19-nor-pregnen-3β-ol-6,11-dione. |
| Acetate of 16β-methyl-$\Delta^{5(10)}$-19-nor-pregnen-3β-ol-6,20-dione. | Acetate of 1α-bromo-16β-methyl-$\Delta^{5(10)}$-19-nor-pregnen-3β-ol-6,20-dione. |
| Diacetate of 16α-methyl-$\Delta^{5(10)}$-19-nor-pregnene-3β,17α-diol-6-20-dione. | Diacetate of 1α-bromo-16α-methyl-$\Delta^{5(10)}$-19-nor-pregnene-3β,17α-diol-6,20-dione. |
| Acetate of 16α-methyl-17,20;20,21-bismethylene-dioxy-$\Delta^{5(10)}$-19-nor-pregnen-3β-ol-6-one. | Acetate of 1α-bromo-16α-methyl-17,20;20,21-bis-methylenedioxy-$\Delta^{5(10)}$-19-nor-pregnen-3β-ol-6-one. |
| Diacetate of 17,20;20,21-bismethylenedioxy-$\Delta^{5(10)}$-19-nor-pregnene-3β,16α-diol-6-one. | Diacetate of 1α-bromo-17,20;20,21-bismethylenedioxy-$\Delta^{5(10)}$-19-nor-pregnene-3β,16α-diol-6-one. |

Example II

A solution of 3 g. of the acetate of 1α-bromo-$\Delta^{5(10)}$-

19-nor-pregnen-3β-ol-6,20-dione in 150 cc. of methanol was refluxed for 1 hour with 1 g. of potassium hydroxide dissolved in 5 cc. of water. It was cooled, diluted with water, the formed precipitate was filtered off and dried under vacuo.

The foregoing total product dissolved in 20 cc. of cold dimethylformamide was added to a boiling suspension of 4 g. of finely divided calcium carbonate in 10 cc. of dimethylformamide. The mixture was refluxed for 30 minutes further, cooled and filtered. The filtrate was diluted with water and extracted with ethyl acetate. The extract was washed with dilute hydrochloric acid, water, aqueous sodium bicarbonate solution and water; dried over anhydrous sodium sulfate and evaporated to dryness. The residue was crystallized from acetone-hexane to give $\Delta^{1,3,5(10)}$-19-nor-pregnatriene-6,20-dione.

*Example III*

A mixture of 5 g. of 3-acetoxy-20-ethylenedioxy-$\Delta^{5(10)}$-19-nor-pregnen-6-one, 50 cc. of acetic anhydride and 500 mg. of p-toluenesulfonic acid was heated at reflux temperature with slow distillation, for 6 hours. It was then poured into ice water and the mixture stirred for 30 minutes to hydrolize the excess anhydride. It was extracted with methylene-chloride and the extract was washed with sodium carbonate solution and water to neutral, dried over anhydrous sodium sulfate and evaporated to dryness, to produce 3,6-diacetoxy-20-ethylenedioxy-$\Delta^{1(10),5}$-19-nor-pregnadiene.

To a mixture of 1 g. of the foregoing crude product, 50 cc. of acetone and 10 drops of pyridine there was added 0.7 g. of sodium acetate dissolved in 7 cc. of water. The mixture was cooled to 0° C. and 450 mg. of N-bromoacetamide (1.1 equivalents) suspended in 5.7 cc. of acetic acid were added; the mixture was stirred a 0° C. for 1 hour further, poured into ice water and the formed precipitate was filtered off. There was thus obtained the acetate of 1α-bromo-20-ethylenedioxy-$\Delta^{5(10)}$-19-nor-pregnen-3β-ol-6-one.

The brominated product was then submitted to the reactions described in the preceding example, i.e., treatment with potassium hydroxide in methanol followed by reaction with calcium carbonate in dimethylformamide.

The total dehydrobromination product was dissolved in 150 cc. of acetone, there were added 500 mg. of p-toluenesulfonic acid and the reaction mixture was kept at room temperature overnight, poured into water and extracted with ethyl acetate. The organic extract was washed with water, 5% aqueous sodium carbonate solution and water to neutral, dried over anhydrous sodium sulfate and evaporated to dryness under reduced pressure. The residue was crystallized from acetone-ether to afford $\Delta^{1,3,5(10)}$-19-nor-pregnatriene-6,20-dione, identical to that obtained in the preceding example.

In the same manner, starting from 16α-methyl-3-acetoxy-20-ethylenedioxy-$\Delta^{5(10)}$-19-nor-pregnen-6-one and 3,17-diacetoxy-20-ethylenedioxy-$\Delta^{5(10)}$-19-nor-pregnen-6-one, there were obtained as final products 16α-methyl-$\Delta^{1,3,5(10)}$-19-nor-pregnatriene-6,20-dione and $\Delta^{1,3,5(10)}$-19-nor-pregnatrien-17α-ol-6,20-dione.

*Example IV*

In the method of Example II dimethylformamide was substituted by dimethylacetamide to produce also $\Delta^{1,3,5(10)}$-19-nor-pregnatriene-6,20-dione in similar yield.

*Example V*

A solution of 2 g. of the acetate of 1α-bromo-16α-methyl-$\Delta^{5(10)}$-19-nor-pregnen-3β-ol-6,20-dione in 100 cc. of methanol was treated with 5 cc. of a 5% aqueous potassium hydroxide solution and the reaction mixture was refluxed for 2 hours under an atmosphere of nitrogen; it was then neutralized with acetic acid and the methanol was distilled under reduced pressure. The residue was triturated with water, the solid was filtered off, washed with water and dried.

The foregoing total product was heated at reflux temperature, for 30 minutes, with 10 cc. of γ-collidine under an atmosphere of nitrogen; the solution was cooled, the precipitate was filtered off and the filtrate was diluted with ether, washed with dilute hydrochloric acid, sodium bicarbonate solution and water, dried and evaporated to dryness. The residue was crystallized from ether-hexane thus producing 16α-methyl-$\Delta^{1,3,5(10)}$-19-nor-pregnatriene-6,20-dione.

In the same manner, the acetate of 1α-bromo-16α,17α-isopropylidenedioxy-$\Delta^{5(10)}$-19-nor-pregnen-3β-ol-6,20-dione and the acetate of 1α-bromo-16β-methyl-$\Delta^{5(10)}$-19-nor-pregnen-3β-ol-6,20-dione gave as final products 16α,17α-isopropylidenedioxy-$\Delta^{1,3,5(10)}$-19-nor-pregnatriene-6,20-dione and 16β-methyl-$\Delta^{1,3,5(10)}$-19-nor-pregnatriene-6,20-dione respectively.

*Example VI*

In accordance with the method described in Example II, the 1α-bromo-compounds below mentioned (I), were treated with potassium hydroxide in methanol solution followed by treatment with calcium carbonate in dimethylformamide, thus producing the corresponding $\Delta^{1,3,5(10)}$-estratrienes (II):

| I | II |
|---|---|
| Diacetate of 1α-bromo-$\Delta^{5(10)}$-19-nor-pregnene-3β,17α-diol-6,20-dione. | $\Delta^{1,3,5(10)}$-19-nor-pregnatrien-17α-ol-6,20-dione. |
| Acetate of 1α-bromo-17,20; 20,21-bismethylenedioxy-$\Delta^{5(10)}$-19-nor-pregnen-3β-ol-6-one. | 17,20; 20,21-bismethylenedioxy-$\Delta^{1,3,5(10)}$-19-nor-pregnatrien-6-one. |
| Acetate of 1α-bromo-17,20; 20,21-bismethylenedioxy-$\Delta^{5(10)}$-19-nor-pregnen-3β-ol-6,11-dione. | 17,20; 20,21-bismethylenedioxy-$\Delta^{1,3,5(10)}$-19-nor-pregnatriene-6,11-dione. |
| Acetate of 16α-methyl-1α-bromo-17,20; 20,21-bismethylenedioxy-$\Delta^{5(10)}$-19-nor-pregnen-3β-ol-6-one. | 16α-methyl-17,20; 20,21-bismethylenedioxy-$\Delta^{1,3,5(10)}$-19-nor-pregnatrien-6-one. |
| Diacetate of 16α-methyl-1α-bromo-$\Delta^{5(10)}$-19-nor-pregnene-3β,17α-diol-6,20-dione. | 16α-methyl-$\Delta^{1,3,5(10)}$-19-nor-pregnatrien-17α-ol-6,20-dione. |
| Diacetate of 1α-bromo-17,20; 20,21-bismethylenedioxy-$\Delta^{5(10)}$-19-nor-pregnene-3β,16α-diol-6-one. | 17,20; 20,21-bismethylenedioxy-$\Delta^{1,3,5(10)}$-19-nor-pregnatrien-16α-ol-6-one. |

*Example VII*

A mixture of 1.5 g. of the acetate of 16α-methyl-17,20;20,21-bismethylenedioxy-$\Delta^{5(10)}$-19-nor-pregnen-3β-ol-6-one, 20 cc. of isopropenyl acetate and 60 mg. of p-toluenesulfonic acid was heated at reflux temperature with slow distillation for 8 hours and then cooled. The resulting solution was diluted with ethyl acetate, washed with water, aqueous sodium bicarbonate solution and then with water to neutral, dried over anhydrous sodium sulfate and evaporated to dryness under reduced pressure, to give 3,6-diacetoxy-17,20;20,21-bismethylenedioxy-16α-methyl-$\Delta^{1(10),5}$-19-nor-pregnadiene.

The foregoing compound was treated with 1.1 equivalents of N-bromoacetamide in acetone solution, by following the method described in Example III, to produce the acetate of 1α-bromo-16α-methyl-17,20;20,21-bismethylenedioxy-$\Delta^{5(10)}$-19-nor-pregnen-3β-ol-6-one.

The preceding compound was treated with potassium hydroxide in methanol and then with calcium carbonate in dimethyl acetamide, in accordance with the method described in Examples II and IV, to produce 16α-methyl-17,20;20,21-bismethylenedioxy-$\Delta^{1,3,5(10)}$-19-nor-pregnatrien-6-one identical to that obtained in the preceding example.

A mixture of 1 g. of this compound and 20 cc. of 60% formic acid was heated on the steam bath for 1 hour, cooled, diluted with water and the formed precipitate collected by filtration, washed with water, dried and recrystallized from acetone-hexane, thus producing 16α-methyl-$\Delta^{1,3,5(10)}$-19-nor-pregnatriene-17α,21-diol-6,20-dione.

In the same manner, starting from the acetate of 16β-methyl-17,20;20,21-bismethylenedioxy-$\Delta^{5(10)}$-19-nor-pregnen-3β-ol-6-one there was obtained as final product 16β-methyl-$\Delta^{1,3,5(10)}$-19-nor-pregnatriene-17α,21-diol-6,20-dione.

Example VIII

To a stirred solution of 1 g. of 3,6-diacetoxy 16α-methyl-17,20;20,21-bismethylenedioxy-$\Delta^{1(10),5}$-19-nor-pregnadiene in 75 cc. of carbon tetrachloride and 75 cc. of anhydrous tetrahydrofuran there were added 4 g. of anhydrous sodium acetate and 400 mg. of bromine in 5 cc. of carbon tetrachloride, and the mixture was stirred for 20 minutes further. An excess of sodium bisulfite solution was then added, the organic layer was separated and washed several times with water, dried over anhydrous sodium sulfate and evaporated to dryness under reduced pressure. Crystallization of the residue from acetone-ether gave the acetate of 1α-bromo-16α-methyl-17,20;20,21-bismethylenedioxy-19-nor-pregnen-3β-ol-6-one, identical to that obtained in Example I.

Example IX

By following the method described in Example VII, the compounds below mentioned (I) were hydrolyzed with 60% formic acid to give the corresponding products (II):

| I | II |
|---|---|
| 17,20; 20,21-bismethylenedioxy-$\Delta^{1,3,5(10)}$-19-nor-pregnatrien-6-one. | $\Delta^{1,3,5(10)}$-19-nor-pregnatriene-17α,21-diol-6,20-dione. |
| 17,20; 20,21-bismethylenedioxy-$\Delta^{1,3,5(10)}$-19-nor-pregnatriene-6,11-dione. | $\Delta^{1,3,5(10)}$-19-nor-pregnatriene-17α,21-diol-6,11,20-trione. |
| 17,20; 20,21-bismethylenedioxy-$\Delta^{1,3,5(10)}$-19-nor-pregnatrien-16α-ol-6-one. | $\Delta^{1,3,5(10)}$-19-nor-pregnatriene-16α,17α,21-triol-6,20-dione. |

Example X

A strain of *Curvularia lunata* ATCC 13935 was grown in a Sabourini-glucose-agar medium (Difco). The growth obtained after incubating for a week at 25° C. was suspended in 5 cc. of sterile water. This suspension was divided in 5 portions of 1 cc. each which were employed for inoculating 5 Erlenmeyer flasks of 250 cc. capacity containing each 50 cc. of a culture medium of the following composition:

| | G. |
|---|---|
| Glucose | 20 |
| $(NH_4)_2HPO_4$ or | 5 |
| $NaNO_3$ | 3 |
| $K_2HPO_4$ | 1 |
| $MgSO_4 \cdot 7H_2O$ | 0.2 |
| KCl | 0.5 |
| $ZnSO_4$ | Traces |
| $FeSO_4 \cdot 7H_2O$ | Traces |
| Distilled water to complete 1 lt. | |

The cultures were incubated under rotatory stirring for 72 hours at 25° C. The growth was homogenized for 1 minute in a Waring Blendor; 2 cc. portions of the suspension thus obtained were employed for inoculating approximately 100 Erlenmeyer flasks containing the same medium described above. The mixtures were incubated for 24 hours under rotary stirring at 25° C. and 280 r.p.m.; to each flask there was added 0.5 cc. of a solution of 0.5 g. of $\Delta^{1,3,5(10)}$-19-nor-pregnatriene-17α,21-diol-6,20-dione in 50 cc. of 95% ethanol and the incubation was continued under the same conditions for 48 hours. The contents of the flasks were combined and extracted with four portions of methylene chloride. The combined extract was dried over anhydrous sodium sulfate and concentrated at low temperature to a volume of 25 cc. This solution was adsorbed on 4 g. of silica gel and eluted methylene chloride-ether (9:1) to produce $\Delta^{1,3,5(10)}$-19-nor-pregnatriene-11β, 17α,21-triol-6,20-dione.

A mixture of 1 g. of the foregoing compound, 4 cc. of pyridine and 4 cc. of acetic anhydride was allowed to stand at room temperature overnight, poured into water and the formed precipitate collected by filtration. There was thus obtained the 21-acetate of $\Delta^{1,3,5(10)}$-19-nor-pregnatriene-11β,17α,21-triol-6,20-dione.

Example XI

In accordance with the incubation method described in the preceding example, 16α-methyl-$\Delta^{1,3,5(10)}$-19-nor-pregnatriene-17α,21-diol-6,20-dione and $\Delta^{1,3,5(10)}$-19-nor-pregnatriene-16α,17α,21-triol-6,20-dione were converted respectively into 16α-methyl-$\Delta^{1,3,5(10)}$-19-nor-pregnatriene-11β,17α,21-triol-6,21-dione and $\Delta^{1,3,5(10)}$-19-nor-pregnatriene-11β,16α,17α,21-tetrol-6,20-dione, which were esterified with acetic anhydride in pyridine solution to produce the 21-acetate of 16α-methyl-$\Delta^{1,3,5(10)}$-19-nor-pregnatriene-11β,17α,21-triol-6,20-dione and the 16,21-diacetate of $\Delta^{1,3,5(10)}$-19-nor-pregnatriene-11β,16α,17α,21-tetrol-6,20-dione.

Example XII

A solution of 1 g. of the 21-acetate of 16α-methyl-$\Delta^{1,3,5(10)}$-19-nor-pregnatriene-11β,17α,21-triol-6,20-dione in 20 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording the 21-acetate of 16α-methyl-$\Delta^{1,3,5(10)}$-19-nor-pregnatriene-17α,21-diol-6,11,20-trione.

Example XIII

To a solution of 1 g. of $\Delta^{1,3,5(10)}$-19-nor-pregnatriene-11β,16α,17α,21-tetrol-6,20-dione in 50 cc. of acetone there were added 20 drops of 72% perchloric acid. After 1 hour at room temperature 20 drops of pyridine were added and the resulting solution was evaporated to dryness under reduced pressure. 30 cc. of water were added to the residue and it was then extracted several times with ethyl acetate. The combined extracts were washed to neutrality with water, dried over sodium sulfate and evaporated to dryness. The residue upon trituration with methanol gave 16α,17α-isopropylidenedioxy-$\Delta^{1,3,5(10)}$-19-nor-pregnatriene-11β,21-diol-6,20-dione.

Upon esterification of the preceding compound with acetic, propionic and undecenoic anhydrides, in accordance with the method described in Example X, there were obtained the 21-acetate, 21-propionate and 21-undecenoate of 16α,17α-isopropylidenedioxy-$\Delta^{1,3,5(10)}$-19-nor-pregnatriene-11β,21-diol-6,20-dione.

Example XIV

A solution of 500 mg. of $\Delta^{1,3,5(10)}$-19-nor-pregnatriene-16α,17α,21-triol-6,20-dione in 20 cc. of chloroform was treated with 1 g. of acetaldehyde and a few drops of 3 N perchloric acid and the reaction mixture stirred at room temperature for 2 hours. After diluting with water the chloroform layer was separated, washed with aqueous saturated sodium bicarbonate solution and then with water, the chloroform was distilled and the residue was crystallized from acetone-ether, thus yielding the 16α,17α-acetaldehyde acetal of $\Delta^{1,3,5(10)}$-19-nor-pregnatriene-16α,17α,21-triol-6,20-dione.

Example XV

A mixture of 1 g. of $\Delta^{1,3,5(10)}$-19-nor-pregnatriene-11β,16α,17α,21-tetrol-6,20-dione, 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene-chloride. The extract was dried over anhydrous sodium sulfate and evaporated to dryness. Crystallization from acetone-hexane gave the 16,17-acetophenonide of $\Delta^{1,3,5(10)}$-19-nor-pregnatriene - 11β,16α,17α,21 - tetrol - 6,20 - dione. The preceding compound was esterified with acetic anhydride in pyridine, by following the method described in Example X to produce the corresponding 21-monoacetate.

*Example XVI*

In accordance with the method described in Example XII, the 21-propionate of 16α,17α-isopropylidenedioxy-$\Delta^{1,3,5(10)}$ - 19 - nor - pregnatriene - 11β,21 - diol - 6,20-dione and the 21-acetate of 16,17-acetophenonide of $\Delta^{1,3,5(10)}$ - 19 - nor-pregnatriene - 11β,16α,17α,21 - tetrol-6,20-dione were converted respectively into the propionate of 16α,17α - isopropylidenedioxy - $\Delta^{1,3,5(10)}$ - 19 - nor-pregnatrien-21-ol-6,11,21-trione and the 21-acetate of the 16,17-acetophenonide of $\Delta^{1,3,5(10)}$-19-nor-pregnatriene-16α,17α,21-triol-6,11,20-trione.

*Example XVII*

To a solution of 2 g. of $\Delta^{1,3,5(10)}$-19-nor-pregnatrien-17α-ol-6,20-dione in 50 cc. of anhydrous benzene there were added 400 mg. of p-toluenesulfonic acid and 5 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the acetate of $\Delta^{1,3,5(10)}$-19-nor-pregnatrien-17α-ol-6,20-dione.

*Example XVIII*

In accordance with the method described in the preceding example but using propionic, caproic and cyclopentylpropionic anhydrides as esterifying agents, there were obtained the propionate, the caproate, and the cyclopentylpropionate of $\Delta^{1,3,5(10)}$-19-nor-pregnatrien-17α-ol-6,20 - dione and 16α - methyl - $\Delta^{1,3,5(10)}$ - 19 - nor-pregnatrien-17α-ol-6,20-dione.

*Example XIX*

A cooled solution of 4 g. of $\Delta^{1,3,5(10)}$-19-nor-pregnatriene-6,20-dione in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving 21-iodo-$\Delta^{1,3,5(10)}$-19-nor-pregnatriene-6,20-dione. The compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from ethanol-water, thus yielding the acetate of $\Delta^{1,3,5(10)}$-19-nor-pregnatrien-21-ol-6,20-dione. A cold solution of 2 g. of the preceding compound in 50 cc. of methanol was treated with 5 cc. of a 4% aqueous potassium hydroxide solution; the reaction mixture was kept at 0° C. for 1 hour under an atmosphere of nitrogen, neutralized with acetic acid and the methanol was distilled under reduced pressure.

The residue was triturated with water, the solid was filtered off, washed with water and dried under vacuo. Crystallization from ethyl-acetate methanol gave $\Delta^{1,3,5(10)}$-19-nor-pregnatrien-21-ol-6,20-dione.

The latter compound was incubated with a culture of *Curvularia lunata* ATCC 13935, by following the method described in Example X, to produce $\Delta^{1,3,5(10)}$-19-nor-pregnatriene-11β,21-diol-6,20-dione, which was converted into its 21-monoacetate by esterification with acetic anhydride in pyridine solution.

*Example XX*

The preceding example was repeated but using 16α-methyl - $\Delta^{1,3,5(10)}$ - 19 - nor-pregnatriene - 6,20 - dione as starting material, thus yielding successively: 21-iodo-16α-methyl - $\Delta^{1,3,5(10)}$ - 19 - nor-pregnatriene - 6,20 - dione, the acetate of 16α-methyl-$\Delta^{1,3,5(10)}$-19-nor-pregnatrien-21-ol - 6,20 - dione, 16α - methyl - $\Delta^{1,3,5(10)}$ - 19 - nor-pregnatrien - 21 - ol - 6,20 - dione, 16α - methyl - $\Delta^{1,3,5(10)}$-19 - nor-pregnatriene - 11β,21 - diol - 6,20 - dione and the 21-acetate of 16α-methyl-$\Delta^{1,3,5(10)}$-19-nor-pregnatriene-11β,21-diol-6,20-dione.

We claim:

1. A compound of the following formula:

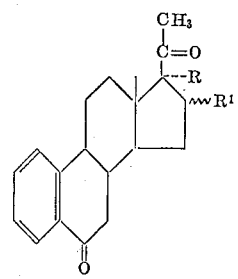

wherein R is selected from the group consisting of hydrogen, hydroxy and an acyloxy radical of less than 12 carbon atoms; $R^1$ is selected from the group consisting of hydrogen, α-methyl, β-methyl, α-hydroxy and α-acyloxy; R and $R^1$ together represent the grouping

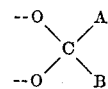

wherein A is selected from the group consisting of hydrogen and a lower alkyl radical and B is selected from the group consisting of lower alkyl, aryl and aralkyl containing up to eight carbon atoms.

2. $\Delta^{1,3,5(10)}$-19-nor-pregnatriene-6,20-dione.
3. $\Delta^{1,3,5(10)}$-19-nor-pregnatriene-17α-ol-6,20-dione.
4. 16α-methyl-$\Delta^{1,3,5(10)}$-19-nor-pregnatriene-6,20-dione.
5. 16α-methyl-$\Delta^{1,3,5(10)}$-19-nor-pregnatriene-17α-ol-6,20-dione.
6. The acetate of 16α-methyl-$\Delta^{1,3,5(10)}$-19-nor-pregnatriene-17α-ol-6,20-dione.
7. 16α,17α-isopropylidenedioxy-$\Delta^{1,3,5(10)}$-19-nor - pregnatriene-6,20-dione.
8. A compound of the following formula:

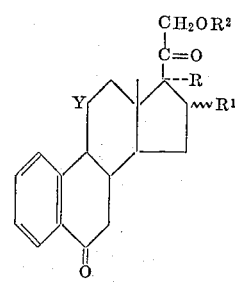

wherein R is selected from the group consisting of hydrogen, hydroxy, and an acyloxy radical of less than 12 carbon atoms; $R^1$ is selected from the group consisting of hydrogen, α-methyl, β-methyl, α-hydroxy and α-acyloxy; R and $R^1$ together represent the grouping

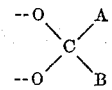

wherein A is selected from the group consisting of hydrogen and a lower alkyl radical and B is selected from the group consisting of lower alkyl, aryl and aralkyl containing up to eight carbon atoms; $R^2$ is selected from the group consisting of hydrogen and an acyl radical of less than 12 carbon atoms and Y is selected from the group consisting of hydrogen, $\beta$-hydroxy and keto.

9. $\Delta^{1,3,5(10)}$-19-nor-pregnatriene-17$\alpha$,21-diol-6,20-dione.

10. $\Delta^{1,3,5(10)}$-19-nor-pregnatriene-11$\beta$,17$\alpha$,21-triol-6,20-dione.

11. $\Delta^{1,3,5(10)}$-19-nor-pregnatriene-17$\alpha$,21 - diol - 6,11,20-trione.

12. 16$\alpha$-methyl-$\Delta^{1,3,5(10)}$-19-nor-pregnatriene - 11$\beta$,17$\alpha$,21-triol-6,20-dione.

13. 16$\alpha$,17$\alpha$-isopropylidenedioxy-$\Delta^{1,3,5(10)}$-pregnatriene-11$\beta$,17$\alpha$,21-triol-6,20-dione.

14. $\Delta^{1,3,5(10)}$-19-nor-pregnatrien-21-ol-6,20-dione.

15. $\Delta^{1,3,5(10)}$-19-nor-pregnatriene-11$\beta$,21-diol-6,20-dione.

16. 16$\alpha$-methyl-$\Delta^{1,3,5(10)}$-19-nor-pregnatriene-21-ol-6,20-dione.

17. 16$\alpha$-methyl-$\Delta^{1,3,5(10)}$-19-nor-pregnatriene - 11$\beta$,21-diol-6,20-dione.

No references cited.